(12) United States Patent
Sun et al.

(10) Patent No.: US 12,527,428 B2
(45) Date of Patent: Jan. 20, 2026

(54) MANUALLY-ADJUSTABLE TEMPERATURE BREWING DEVICE AND CONSTANT TEMPERATURE ADJUSTMENT METHOD

(71) Applicant: Guangdong Gemilai Intelligent Technology Co., Ltd., Foshan (CN)

(72) Inventors: Lidong Sun, Foshan (CN); Wenjing Zhu, Foshan (CN); Jianping Xie, Foshan (CN)

(73) Assignee: Guangdong Gemilai Intelligent Technology Co., Ltd., Foshan (CN)

( * ) Notice: Subject to any disclaimer, the term of this patent is extended or adjusted under 35 U.S.C. 154(b) by 267 days.

(21) Appl. No.: 18/571,365

(22) PCT Filed: Dec. 4, 2023

(86) PCT No.: PCT/CN2023/136233
§ 371 (c)(1),
(2) Date: Dec. 18, 2023

(87) PCT Pub. No.: WO2024/187839
PCT Pub. Date: Sep. 19, 2024

(65) Prior Publication Data
US 2025/0098892 A1    Mar. 27, 2025

(30) Foreign Application Priority Data

Mar. 10, 2023  (CN) .......................... 202310225190.6

(51) Int. Cl.
*A47J 31/36* (2006.01)
*A47J 31/34* (2006.01)
(Continued)

(52) U.S. Cl.
CPC ............. *A47J 31/469* (2018.08); *A47J 31/34* (2013.01); *A47J 31/3671* (2013.01); *A47J 31/4464* (2013.01)

(58) Field of Classification Search
CPC .... A47J 31/34; A47J 31/3671; A47J 31/4464; A47J 31/4467; A47J 31/46; A47J 31/469; A47J 31/44
See application file for complete search history.

(56) References Cited

U.S. PATENT DOCUMENTS 11,266,265 B2 *   3/2022  Duvall ................... A47J 31/56
2011/0252976 A1 * 10/2011  Liu ....................... A47J 31/467
                                                          99/288
(Continued)

FOREIGN PATENT DOCUMENTS

CN      203940041 U    11/2014
CN      204232918 U     4/2015
(Continued)

OTHER PUBLICATIONS

International search report of PCT/CN2023/136233.
(Continued)

*Primary Examiner* — Reginald Alexander

(57) ABSTRACT

The present disclosure relates to a manually-adjustable temperature brewing device and a constant temperature adjustment method. The brewing device includes a brewing head; a side of the secondary high-pressure mixing chamber is arranged with a hot water port and a cold water port the brewing head is arranged with a solenoid valve, and the solenoid valve includes a water inlet port and a water outlet port; the tertiary opening and closing chamber includes an inlet chamber and an outlet chamber; the mixed water outlet is in communication with the inlet chamber, the inlet chamber is in communication with the water inlet port, and the outlet chamber is in communication with the water outlet port; a bottom of the outlet chamber is arranged with an outlet end, and the hot water port and the cold water port are each arranged with a flow regulating device.

7 Claims, 3 Drawing Sheets

(51) Int. Cl.
*A47J 31/46* (2006.01)
*A47J 31/44* (2006.01)

(56) References Cited

U.S. PATENT DOCUMENTS

2013/0243919 A1    9/2013   Shrader et al.
2020/0154933 A1    5/2020   Kuang

FOREIGN PATENT DOCUMENTS

| | | | |
|---|---|---|---|
| CN | 108064139 | A | 5/2018 |
| CN | 108869801 | A | 11/2018 |
| CN | 211748909 | U | 10/2020 |
| CN | 214510800 | U | 10/2021 |
| CN | 217565702 | U | 10/2022 |
| CN | 115886553 | B | 6/2023 |
| DE | 102016216044 | A1 | 3/2018 |
| DE | 202020100937 | U1 | 3/2020 |
| EP | 0540440 | A1 | 5/1993 |
| EP | 2893855 | A1 * | 7/2015 .......... A47J 31/5253 |
| WO | 2011130903 | A1 | 10/2011 |

OTHER PUBLICATIONS

International search opinion of PCT/CN2023/136233.
European Authorisation Notice of 23820725.2.
European search opinion of 23820725.2.
European Search Report of 23820725.2.
First Office Action of CN202310225190.6.
First search of CN202310225190.6.
Notification to Grant Patent Right for Invention of CN202310225190.6.

* cited by examiner

MANUALLY-ADJUSTABLE TEMPERATURE BREWING DEVICE AND CONSTANT TEMPERATURE ADJUSTMENT METHOD

CROSS REFERENCE

The present disclosure claims priority of Chinese Patent Application No. 202310225190.6, filed on Mar. 10, 2023, the entire contents of which are hereby incorporated by reference in their entirety.

TECHNICAL FIELD

The present disclosure relates to technical field of coffee machines, especially relates to a manually-adjustable temperature brewing device and a constant temperature adjustment method.

BACKGROUND

With the development of people's living standards, coffee has become one of the most popular drinks, which can give people pleasure and excitement. The current market coffee machines can be divided into automatic and semi-automatic.

A brewing head, as an important part of the overall structure of the coffee machine, plays the role of convergence of hot and cold water. In the existing technology, CN issued Patent No. CN201178994Y discloses a thermostatic brewing mechanism, in which the cold water and the hot water are respectively injected into the brewing head through a pipeline to adjust the flow rate and achieve the effect of adjusting the temperature. However, the heat exchange time between the cold water and hot water is too short, and the mixing effect between the cold water and hot water is thus not good, which affects the temperature regulation effect of the brewing device.

SUMMARY OF THE DISCLOSURE

A first object of the present disclosure is to provide a manually-adjustable temperature brewing device having the advantage of good mixing between cold and hot water.

The above technical object of the present disclosure is achieved by the following technical solution: a manually-adjustable temperature brewing device, comprising a brewing head; wherein a top of the brewing head is arranged with a combined valve body assembly; a secondary high-pressure mixing chamber and a tertiary opening and closing chamber are defined in the combined valve body assembly; the secondary high-pressure mixing chamber is arranged vertically, a side of the secondary high-pressure mixing chamber is arranged with a hot water port and a cold water port sequentially disposed from top to bottom, and another side of the secondary high-pressure mixing chamber is arranged with a mixed water outlet that is at the same height as the hot water port, the mixed water outlet being in communication with the tertiary opening and closing chamber; the tertiary opening and closing chamber is arranged vertically; the brewing head is arranged with a solenoid valve, and the solenoid valve comprises a water inlet port and a water outlet port; the tertiary opening and closing chamber comprises an inlet chamber and an outlet chamber; the mixed water outlet is in communication with the inlet chamber, the inlet chamber is in communication with the water inlet port, and the outlet chamber is in communication with the water outlet port; a bottom of the outlet chamber is arranged with an outlet end, and the hot water port and the cold water port are each arranged with a flow regulating device.

In some embodiments, the flow regulating device comprises a valve body, a primary flow adjustment chamber, a valve needle, a liquid inlet, a liquid outlet, a valve cover, and a connector; the primary flow adjustment chamber is arranged inside the valve body; the primary flow adjustment chamber is in the form of a T-shape; the valve needle is arranged on a side of the primary flow adjustment chamber, and the valve needle is threadedly connected to a side wall of the primary flow adjustment chamber; the valve needle is arranged facing the liquid inlet, and the valve needle is configured to close to or away from the liquid inlet to regulate an inlet flow rate in a process of the valve needle being moved helically; the valve cover is arranged on another side of the primary flow adjustment chamber, the liquid inlet is arranged inside the valve cover, and the liquid outlet is arranged between the valve needle and the liquid inlet; the liquid outlet is arranged perpendicular to an axial direction of the valve needle.

In some embodiments, the combined valve body assembly comprises a vertical column, a transverse block, and an inclined block; the vertical column is vertically arranged at the top of the brewing head, and the transverse block extends along a radial direction of the vertical column; an end of the transverse block is connected to a side of the vertical column, and a vertical connecting block is arranged at another end of the transverse block; the inclined block is arranged on a side of the transverse block, and an end of the inclined block is inclined related to a horizontal direction.

In some embodiments, the tertiary opening and closing chamber is arranged vertically in the vertical column, and the secondary high-pressure mixing chamber is arranged between the transverse block and the vertical connecting block; an end face of the inclined block is arranged with an inlet port and an outlet port, which are arranged facing the water inlet port and the water outlet port of the solenoid valve, respectively; the hot water port and the cold water port are arranged on an end face of the vertical connecting block; the inlet chamber is vertically arranged between the transverse block and the vertical column, the inlet chamber defines a threaded hole running upwardly in a vertical direction, and the threaded hole is internally threaded with a threaded rod.

In some embodiments, the connector is arranged at a position of the liquid outlet.

In some embodiments, an outward end of the valve needle is arranged with an adjustment handle.

In some embodiments, an end of the adjustment handle defines a transverse groove along a radial direction of the adjustment handle.

In some embodiments, the brewing head is disc-shaped.

In some embodiments, the combined valve body assembly is made of metal.

A second object of the present disclosure is to provide a constant temperature adjustment method, applied to a brewing device.

The above technical object of the present disclosure is achieved by the following technical solution: a constant temperature adjustment method, applied to the brewing device as above and comprising:

Step 1, injecting a high-temperature and high-pressure liquid into the primary flow adjustment chamber that is in communication with the hot water port; changing an area of the water inlet port by the valve needle, and changing a volume of the primary flow adjustment chamber by a cone of the valve needle, for changing a flow rate of the water outlet port;

Step 2, injecting a low-temperature liquid into the primary flow adjustment chamber that is in communication with the cold water port; changing an area of the water inlet port by the valve needle, and changing a volume of the primary flow adjustment chamber by a cone of the valve needle, for changing a flow rate of the water outlet port;

Step 3, mixing the liquid from steps 1 and 2 into the secondary high-pressure mixing chamber, wherein the mixed water outlet of the secondary high-pressure mixing chamber is in the same axis as the liquid outlet of the primary flow adjustment chamber that is in communication with the hot water port; the liquid in the liquid outlet of the primary flow adjustment chamber that is in communication with the hot water port is caused to first pass through the mixed water outlet;

Step 4, causing the mixed liquid in the secondary high-pressure mixing chamber to enter a top of the inlet chamber along the horizontal direction and enter the water inlet port of the solenoid valve through a bottom of the inlet chamber along the horizontal direction;

Step 5, closing the solenoid valve, such that the high-temperature and high-pressure liquid is insulated and pressure-retained in the secondary high pressure mixing chamber; and Step 6, opening the solenoid valve, such that the mixed liquid enters a side of the outlet chamber through the water outlet port, and the mixed liquid flows downwardly through the outlet end at the bottom of the outlet chamber.

In summary, the present disclosure has the following advantages: first, the combined valve body assembly is arranged with a mixing chamber, such that the first two liquids are fully mixed, and then the liquid with stabilized temperature is output for brewing coffee through the control of the solenoid valve; second, the mixing chamber has the hot water port and the cold water port that are vertically distributed up and down, where the hot water port with a valve body is on the top, and the cold water port with a valve body is on the bottom, and through the rotation of the valve needle under manual control, the flow size of the water circuit can be controlled, and the flow of hot and cold water circuit can be adjusted, which is conducive to the stable control of the temperature, and the temperature adjustment range is broader; third, the mixing chamber is internally arranged, such that when the machine is preheating, the brewing head can be fully and automatically preheated and heat preserved to the desired temperature, and when brewing, the user do not have to discharge the residual water and can brew coffee directly, thereby saving time and water; fourth, the other side of the secondary high-pressure mixing chamber has a mixed water outlet at the same height as the hot water port, such that the hot water firstly enters the inlet chamber through the mixed water outlet to ensure that the liquid is maintained in the state of hot water, which maintains the stability of the temperature and avoids the uneven mixing of hot and cold water in the existing technology, thereby ensuring the temperature of the liquid.

Figure 1:
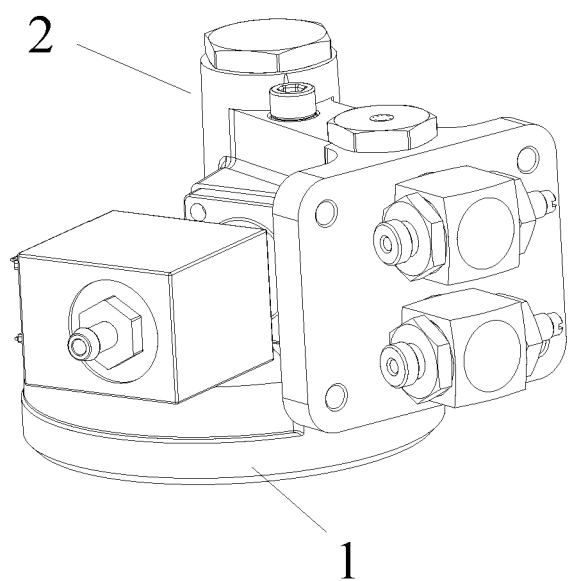
FIG. 1 is a structural schematic view according to the embodiments of the present disclosure.

Reference numerals: 1, brewing head; 2, combined valve body assembly; 21, vertical column; 22, transverse block; 23, inclined block; 24, vertical connecting block; 3, secondary high-pressure mixing chamber; 31, hot water port; 32, cold water port; 33, mixed water outlet; 4, tertiary opening and closing chamber; 41, inlet chamber; 42, threaded hole; 43, threaded rod; 44, outlet chamber; 45, outlet end; 5, solenoid valve; 51, inlet port; 52, outlet port; 6, valve body; 61, primary flow adjustment chamber; 62, valve needle; 63, adjustment handle; 64, transverse groove; 65, liquid inlet; 66, liquid outlet; 67, valve cover; 68, connector.

DETAILED DESCRIPTION

The present disclosure is described in further detail below in conjunction with the accompanying drawings.

The specific embodiments are only for an explanation of the present disclosure, which is not a limitation of the present disclosure, and those skilled in the art may make modifications to the embodiments without creative contribution as needed after reading this specification. Any scheme is protected by patent law as long as it is within the scope of the claims of the present disclosure.

Embodiment

As shown in FIGS. 1 to 6, provided is a manually-adjustable temperature brewing device including a brewing head 1; the brewing head 1 is disc-shaped, and a top of the brewing head 1 is arranged with a combined valve body assembly 2; the combined valve body assembly 2 may be made of metal or plastic, and the combined valve body assembly 2 in the embodiments is made of metal as an example; a secondary high-pressure mixing chamber 3 and a tertiary opening and closing chamber 4 are defined in the combined valve body assembly 2; the secondary high-pressure mixing chamber 3 is arranged vertically, a side of the secondary high-pressure mixing chamber 3 is arranged with a hot water port 31 and a cold water port 32 sequentially disposed from top to bottom, and another side of the secondary high-pressure mixing chamber 3 is arranged with a mixed water outlet 33 that is at the same height as the hot water port 31, the mixed water outlet 33 being in communication with the tertiary opening and closing chamber 4; the tertiary opening and closing chamber 4 is arranged vertically; the brewing head 1 is arranged with a solenoid valve 5, and the solenoid valve 5 includes a water inlet port and a water outlet port; the solenoid valve 5 is opened or closed to control opening and closing between the water inlet port and the water outlet port; the tertiary opening and closing chamber 4 includes an inlet chamber 41 and an outlet chamber 44; the mixed water outlet 33 is in communication with the inlet chamber 41, the inlet chamber 41 is in communication with the water inlet port, and the outlet chamber 44 is in communication with the water outlet port; a bottom of the outlet chamber 44 is arranged with an outlet end 45, and the hot water port 31 and the cold water port 32 are each arranged with a flow regulating device.

Figure 5:
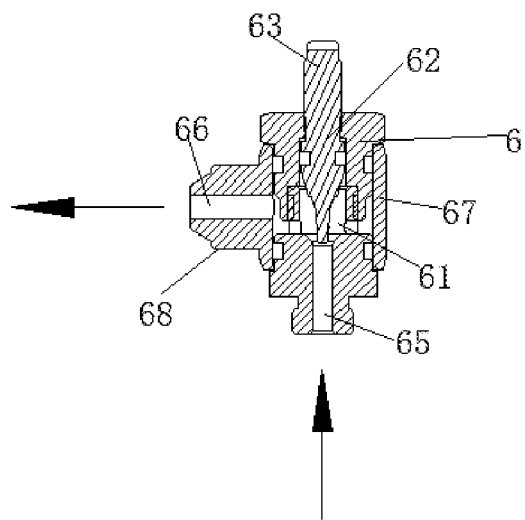
FIG. 5 is a sectional schematic view of a valve body according to the embodiments of the present disclosure.
Figure 6:
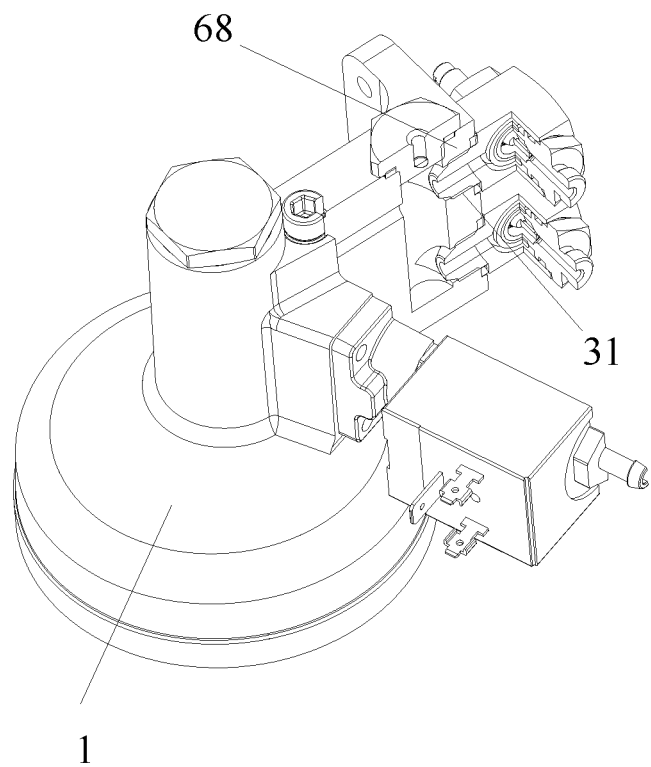
FIG. 6 is a sectional schematic view of a combined valve body according to the embodiments of the present disclosure.

As shown in FIGS. 5 and 6, the flow regulating device includes a valve body 6, a primary flow adjustment chamber 61, a valve needle 62, a liquid inlet 65, a liquid outlet 66, a valve cover 67, and a connector 68; the primary flow adjustment chamber 61 is arranged inside the valve body 6; the primary flow adjustment chamber 61 is in the form of a T-shape; the valve needle 62 is arranged on a side of the primary flow adjustment chamber 61, and the valve needle 62 is threadedly connected to a side wall of the primary flow adjustment chamber 61; the valve needle 62 is arranged facing the liquid inlet 65, and the valve needle 62 is moved close to or away from the liquid inlet 65 to regulate the inlet flow rate in the process of the valve needle 62 being moved helically; the valve cover 67 is arranged on another side of the primary flow adjustment chamber 61, the liquid inlet 65 is arranged inside the valve cover 67, and the liquid outlet 66 is arranged between the valve needle 62 and the liquid inlet 65; the liquid outlet 66 is arranged perpendicular to an axial direction of the valve needle 62.

Figure 2:
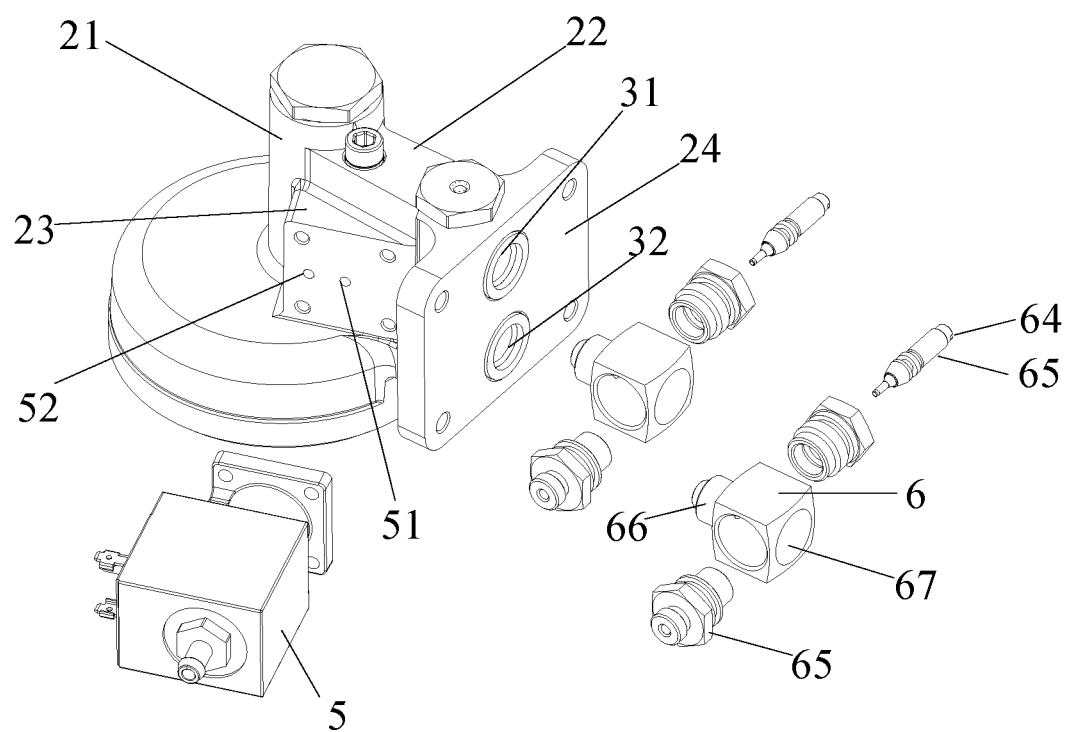
FIG. 2 is an exploded schematic view of a brewing device according to the embodiments of the present disclosure.
Figure 3:
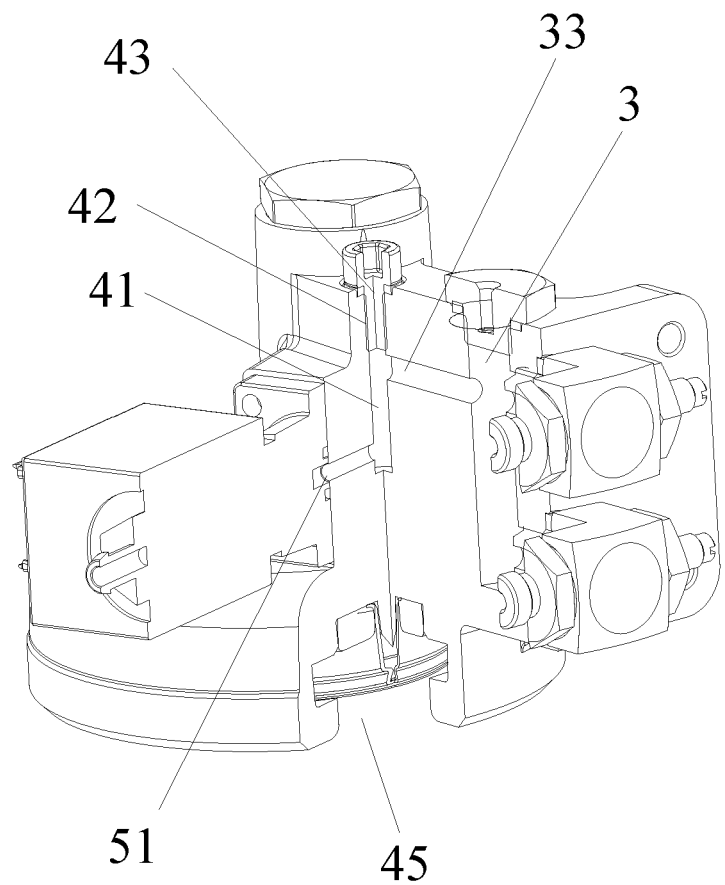
FIG. 3 is a partial sectional view of a brewing device according to the embodiments of the present disclosure.
Figure 4:
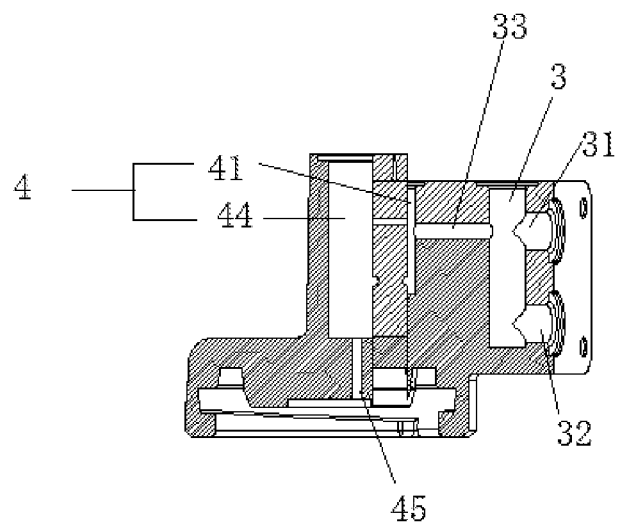
FIG. 4 is a sectional schematic view according to the embodiments of the present disclosure.

As shown in FIGS. 1 and 2, in order to facilitate the operator to manually adjust the valve needle 62, an outward end of the valve needle 62 is arranged with an adjustment handle 63, and an end of the adjustment handle 63 defines a transverse groove 64 along a radial direction of the adjustment handle 63, such that the valve needle 62 can be rotated by means of a slotted screwdriver; in order to facilitate the valve body 6 to be inserted into the positions of the cold water port 32 and the water outlet port, the connector 68 is arranged in the position of the liquid outlet 66.

As shown in FIGS. 1 to 6, the combined valve body assembly 2 includes a vertical column 21, a transverse block 22, and an inclined block 23; the vertical column 21 is vertically arranged at a top of the brewing head 1, and the transverse block 22 extends along a radial direction of the vertical column 21; an end of the transverse block 22 is connected to a side of the vertical column 21, and a vertical connecting block 24 is arranged at another end of the transverse block 22; the inclined block 23 is arranged on a side of the transverse block 22, and an end of the inclined block 23 is inclined related to a horizontal direction; the tertiary opening and closing chamber 4 is arranged vertically in the vertical column 21, and the secondary high-pressure mixing chamber 3 is arranged between the transverse block 22 and the vertical connecting block 24; an end face of the inclined block 23 is arranged with an inlet port 51 and an outlet port 52, which are arranged facing the water inlet port and the water outlet port of the solenoid valve, respectively; the hot water port 31 and the cold water port 32 are arranged on an end face of the vertical connecting block 24; the inlet chamber 41 is vertically arranged between the transverse block 22 and the vertical column 21, and the inlet chamber 41 defines a threaded hole 42 running upwardly in a vertical direction, and the threaded hole 42 is internally threaded with a threaded rod 43.

The working principle and thermostatic adjustment method of the brewing device is as follows, including the following steps.

Step 1, injecting a high-temperature and high-pressure liquid into the primary flow adjustment chamber 61 that is in communication with the hot water port 31, i.e., the valve body 6 disposed at the position of the hot water port; changing an area of the water inlet port by rotating the valve needle 62, and changing a volume of the primary flow adjustment chamber 61 with a cone at an end of the valve needle 62 by rotating the valve needle 62, for changing a flow rate of the water outlet port;

Step 2, injecting a low-temperature liquid into the primary flow adjustment chamber 61 that is in communication with the cold water port 32; changing the area of the water inlet port by rotating the valve needle 62, and changing the volume of the primary flow adjustment chamber 61 with the cone at the end of the valve needle 62 by rotating the valve needle 62, for changing the flow rate of the water outlet port;

Step 3, mixing the liquid in steps 1 and 2 into the secondary high-pressure mixing chamber 3, where the mixed water outlet 33 of the secondary high-pressure mixing chamber 3 is in the same axis as the liquid outlet 66 of the primary flow adjustment chamber 61 that is in communication with the hot water port 31; the liquid in the liquid outlet 66 of the primary flow adjustment chamber 61 that is in communication with the hot water port 31 is caused to first pass through the mixed water outlet 33; the liquid in the liquid outlet 66 of the primary flow adjustment chamber 61 that is in communication with the hot water port 31 is caused to flow upwardly and pass through the mixed water outlet 33; in this way, the mixing of the two liquids is achieved, while the combined valve body assembly 2 plays a role of heat preservation and pressure preservation;

Step 4, causing the mixed liquid in the secondary high-pressure mixing chamber 3 to enter a top of the inlet chamber 41 along a horizontal direction and enter the water inlet port of the solenoid valve 5 through a bottom of the inlet chamber 41 along a horizontal direction;

Step 5, closing the solenoid valve 5, such that the high-temperature and high-pressure liquid is insulated and pressurized in the secondary high pressure mixing chamber 3;

Step 6, opening the solenoid valve 5, such that the mixed liquid enters a side of the outlet chamber 44 through the water outlet port, and the mixed liquid flows downwardly through the outlet end 45 at a bottom of the outlet chamber 44.

What is claimed is:

1. A manually-adjustable temperature brewing device, comprising a brewing head (1); wherein a top of the brewing head (1) is arranged with a combined valve body assembly (2); a secondary high-pressure mixing chamber (3) and a tertiary opening and closing chamber (4) are defined in the combined valve body assembly (2); the secondary high-pressure mixing chamber (3) is arranged vertically, a side of the secondary high-pressure mixing chamber (3) is arranged with a hot water port (31) and a cold water port (32) sequentially disposed from top to bottom, and another side of the secondary high-pressure mixing chamber (3) is arranged with a mixed water outlet (33) that is at the same height as the hot water port (31), the mixed water outlet (33) being in communication with the tertiary opening and closing chamber (4); the tertiary opening and closing chamber (4) is arranged vertically; the brewing head (1) is arranged with a solenoid valve (5), and the solenoid valve (5) comprises a water inlet port and a water outlet port; the tertiary opening and closing chamber (4) comprises an inlet chamber (41) and an outlet chamber (44); the mixed water outlet (33) is in communication with the inlet chamber (41), the inlet chamber (41) is in communication with the water inlet port, and the outlet chamber (44) is in communication with the water outlet port; a bottom of the outlet chamber (44) is arranged with an outlet end (45), and the hot water port (31) and the cold water port (32) are each arranged with a flow regulating device;

the flow regulating device comprises a valve body (6), a primary flow adjustment chamber (61), a valve needle (62), a liquid inlet (65), a liquid outlet (66), a valve cover (67), and a connector (68); the primary flow adjustment chamber (61) is arranged inside the valve body (6);

the primary flow adjustment chamber (61) is in the form of a T-shape; the valve needle (62) is arranged on a side of the primary flow adjustment chamber (61), and the valve needle (62) is threadedly connected to a side wall of the primary flow adjustment chamber (61); the valve needle (62) is arranged facing the liquid inlet (65), and the valve needle (62) is configured to close to or away from the liquid inlet (65) to regulate an inlet flow rate in a process of the valve needle (62) being moved helically; the valve cover (67) is arranged on another side of the primary flow adjustment chamber (61), the liquid inlet (65) is arranged inside the valve cover (67), and the liquid outlet (66) is arranged between the valve needle (62) and the liquid inlet (65); the liquid outlet (66) is arranged perpendicular to an axial direction of the valve needle (62);

the combined valve body assembly (2) comprises a vertical column (21), a transverse block (22), and an inclined block (23); the vertical column (21) is vertically arranged at the top of the brewing head (1), and the transverse block (22) extends along a radial direction of the vertical column (21); an end of the transverse block (22) is connected to a side of the vertical column (21), and a vertical connecting block (24) is arranged at another end of the transverse block (22);

the inclined block (23) is arranged on a side of the transverse block (22), and an end of the inclined block (23) is inclined related to a horizontal direction;

the tertiary opening and closing chamber (4) is arranged vertically in the vertical column (21), and the secondary high-pressure mixing chamber (3) is arranged between the transverse block (22) and the vertical connecting block (24); an end face of the inclined block (23) is arranged with an inlet port (51) and an outlet port (52), which are arranged facing the water inlet port and the water outlet port of the solenoid valve, respectively; the hot water port (31) and the cold water port (32) are arranged on an end face of the vertical connecting block (24); the inlet chamber (41) is vertically arranged between the transverse block (22) and the vertical column (21), the inlet chamber (41) defines a threaded hole (42) running upwardly in a vertical direction, and the threaded hole (42) is internally threaded with a threaded rod (43).

2. The brewing device according to claim 1, wherein the connector (68) is arranged at a position of the liquid outlet (66).

3. The brewing device according to claim 1, wherein an outward end of the valve needle (62) is arranged with an adjustment handle (63).

4. The brewing device according to claim 3, wherein an end of the adjustment handle (63) defines a transverse groove (64) along a radial direction of the adjustment handle (63).

5. The brewing device according to claim 1, wherein the brewing head (1) is disc-shaped.

6. The brewing device according to claim 1, wherein the combined valve body assembly (2) is made of metal.

7. A constant temperature adjustment method, applied to the brewing device according to claim 1 and comprising:

Step 1, injecting a high-temperature and high-pressure liquid into the primary flow adjustment chamber (61) that is in communication with the hot water port (31); changing an area of the water inlet port by the valve needle (62), and changing a volume of the primary flow adjustment chamber (61) by a cone of the valve needle (62), for changing a flow rate of the water outlet port;

Step 2, injecting a low-temperature liquid into the primary flow adjustment chamber (61) that is in communication with the cold water port (32); changing an area of the water inlet port by the valve needle (62), and changing a volume of the primary flow adjustment chamber (61) by a cone of the valve needle (62), for changing a flow rate of the water outlet port;

Step 3, mixing the liquid from steps 1 and 2 into the secondary high-pressure mixing chamber (3), wherein the mixed water outlet (33) of the secondary high-pressure mixing chamber (3) is in the same axis as the liquid outlet (66) of the primary flow adjustment chamber (61) that is in communication with the hot water port (31); the liquid in the liquid outlet (66) of the primary flow adjustment chamber (61) that is in communication with the hot water port (31) is caused to first pass through the mixed water outlet (33);

Step 4, causing the mixed liquid in the secondary high-pressure mixing chamber (3) to enter a top of the inlet chamber (41) along the horizontal direction and enter the water inlet port of the solenoid valve (5) through a bottom of the inlet chamber (41) along the horizontal direction;

Step 5, closing the solenoid valve (5), such that the high-temperature and high-pressure liquid is insulated and pressure-retained in the secondary high pressure mixing chamber (3); and Step 6, opening the solenoid valve (5), such that the mixed liquid enters a side of the outlet chamber (44) through the water outlet port, and the mixed liquid flows downwardly through the outlet end (45) at the bottom of the outlet chamber (44).

\* \* \* \* \*